(12) United States Patent
Zhang et al.

(10) Patent No.: US 8,879,462 B2
(45) Date of Patent: Nov. 4, 2014

(54) METHOD, SYSTEM AND DEVICE FOR TRANSMITTING UPLINK FEEDBACK INFORMATION

(75) Inventors: Wenjian Zhang, Beijing (CN); Xueming Pan, Beijing (CN); Zukang Shen, Beijing (CN); Guojun Xiao, Beijing (CN); Libo Wang, Beijing (CN)

(73) Assignee: China Academy of Telecommunications Technology, Beijing (CN)

( * ) Notice: Subject to any disclaimer, the term of this patent is extended or adjusted under 35 U.S.C. 154(b) by 190 days.

(21) Appl. No.: 13/508,065

(22) PCT Filed: Oct. 22, 2010

(86) PCT No.: PCT/CN2010/001669
§ 371 (c)(1),
(2), (4) Date: May 4, 2012

(87) PCT Pub. No.: WO2011/054172
PCT Pub. Date: May 12, 2011

(65) Prior Publication Data
US 2012/0218935 A1    Aug. 30, 2012

(30) Foreign Application Priority Data

Nov. 5, 2009   (CN) .......................... 2009 1 0237236

(51) Int. Cl.
*H04B 7/14*     (2006.01)
*H04L 5/00*     (2006.01)
(Continued)

(52) U.S. Cl.
CPC ........... *H04B 7/15542* (2013.01); *H04W 88/08* (2013.01); *H04L 5/0094* (2013.01);
(Continued)

(58) Field of Classification Search
CPC .................................................. H04B 7/15542
See application file for complete search history.

(56) References Cited

U.S. PATENT DOCUMENTS

2004/0171401 A1   9/2004   Balachandran et al.
2008/0101287 A1   5/2008   Kim et al.
(Continued)

FOREIGN PATENT DOCUMENTS

CN      101478379 A      7/2009
CN      101489255 A      7/2009
(Continued)

OTHER PUBLICATIONS

European Search Report for EP-10827786.
(Continued)

*Primary Examiner* — Robert Wilson
(74) *Attorney, Agent, or Firm* — Kilpatrick Townsend & Stockton LLP

(57) ABSTRACT

There are a method, system and device for transmitting uplink feedback information by allocating a PUCCH resource to an RN device in LTE-A system so that the RN device can transmit uplink feedback information over the allocated PUCCH resource. The method according to an embodiment of the present invention includes: a base station selecting from a PUCCH resources pool at least one dedicated PUCCH resources for each RN device served by the base station and transmitting a resources index number corresponding to the PUCCH resource to the each RN device respectively in higher layer signaling, the resource index number is used for indicating the RN device to transmit the uplink feedback information over the PUCCH resources corresponding to the resources index number. In the embodiment of the present invention, a PUCCH resource can be allocated to the RN device in LTE-A system so that the RN device can transmit the uplink feedback information over the allocated PUCCH resources.

6 Claims, 3 Drawing Sheets

| PUCCH resource allocated to an RN device 1 |
| PUCCH resource allocated to an RN device 2 |
| PUCCH resource allocated to an RN device 3 |
| PUCCH resource allocated to a user equipment served by a macro base station |

(51) Int. Cl.
*H04B 7/155* (2006.01)
*H04L 1/16* (2006.01)
*H04W 72/02* (2009.01)
*H04L 1/18* (2006.01)
H04W 88/08 (2009.01)
H04W 88/04 (2009.01)
H04W 72/04 (2009.01)

(52) U.S. Cl.
CPC .............. *H04W 88/04* (2013.01); *H04L 1/1614* (2013.01); *H04W 72/02* (2013.01); *H04L 1/1861* (2013.01); *H04L 5/0007* (2013.01); *H04W 72/0406* (2013.01)
USPC ........................................ 370/315; 370/328

(56) References Cited

U.S. PATENT DOCUMENTS

2008/0233966 A1 9/2008 Scheim et al.
2008/0311919 A1 12/2008 Whinnett et al.
2009/0197624 A1 8/2009 Kwak et al.
2011/0243066 A1* 10/2011 Nayeb Nazar et al. ....... 370/328
2012/0002593 A1* 1/2012 Kim et al. ..................... 370/315
2012/0093067 A1* 4/2012 Lv et al. ........................ 370/315
2012/0218935 A1* 8/2012 Zhang et al. .................. 370/315

FOREIGN PATENT DOCUMENTS

| | | | |
|---|---|---|---|
| CN | 101521909 A | | 9/2009 |
| EP | 1783966 A2 | | 9/2007 |
| EP | 1773091 A2 | | 11/2007 |
| EP | 2 395 782 | * | 12/2011 |
| EP | 2 418 900 | * | 2/2012 |
| EP | 2 426 997 | * | 3/2012 |

OTHER PUBLICATIONS

3GPP TSG RAN1#57; San Francisco, USA; May 4-8, 2009, pp. 1-4.

* cited by examiner

METHOD, SYSTEM AND DEVICE FOR TRANSMITTING UPLINK FEEDBACK INFORMATION

This application is a US National Stage of International Application No. PCT/CN2010/001669, filed on 22 Oct. 2010, designating the United States, and claiming the benefit of Chinese Patent Application no. 200910237236.6, filed with the Chinese Patent Office on Nov. 5, 2009 and entitled "Method, system and device for transmitting uplink feedback information", which is hereby incorporated by reference in its entirety.

FIELD OF THE INVENTION

The present invention relates to the field of radio communications and particular to a method, system and device for transmitting uplink feedback information.

BACKGROUND OF THE INVENTION

The following nodes, interfaces and links are defined following introduction of a relay node to a Long Term Evolution-Advanced (LTE-A) system as illustrated in FIG. 1.

Nodes include:

Donor-eNB: an eNB (evolved base station) in radio connection with an Relay Node (RN) device or simply DeNB;

Relay-Node: an entity between the DeNB and a UE or simply an RN device;

Relay-UE: a UE in data interaction with the RN device or simply R-UE; and

Macro-UE: UE directly in data interaction with DeNB.

Interfaces include:

Un interface: an interface between the RN device and the DeNB; and

Uu interface: an interface between the UE and the RN device.

Radio links include:

Backhaul link: a link corresponding to the Un interface;

Access link: a link corresponding to the Uu interface; and

Direct link: a link over which data is transmitted between the DeNB and the macro UE.

Downlink transmission following introduction of the RN device: data of the UE arriving at the RN device has to be transmitted from the DeNB to the RN device over a downlink backhaul link and then transmitted from the RN device to the UE over a downlink access link.

Uplink transmission following introduction of the RN device: uplink transmission of the UE under the RN device is firstly transmitted from the UE to the RN device over an uplink access link and then transmitted from the RN device to the DeNB over a backhaul link.

In an LTE system at present, feedback information (Acknowledgement/Negative Acknowledgement, ACK/NACK) corresponding to downlink data received at a user equipment over a Physical Downlink Shared Channel (PDSCH) is transmitted over a Physical Uplink Control Channel (PUCCH) resource allocated at the network side, and the PUCCH resource is bound with an index of a Control Channel Element (CCE) over a Physical Downlink Control Channel (PDCCH). However, there is no solution to allocation of a PUCCH resource to a relay node device in an LTE-A system, thus making it rather difficult for the relay node device to return uplink feedback information over a PUCCH resource upon reception of downlink data from a base station.

In summary there is no solution to allocation of a PUCCH resource to a relay node device in the existing LTE-A system, thus making it rather difficult for the relay node device to transmit uplink feedback information over a PUCCH resource upon reception of information from a base station.

SUMMARY OF THE INVENTION

Embodiments of the invention provide a method, system and device for transmitting uplink feedback information by allocating a PUCCH resource to a relay node device in an LTE-A system so that the relay node device can transmit uplink feedback information over the allocated PUCCH resource.

An embodiment of the invention provides a method for transmitting uplink feedback information, which includes:

a base station selecting from a pool of Physical Uplink Control Channel, PUCCH, resources at least one dedicated PUCCH resource for each Relay Node, RN, device served by the base station; and the base station transmitting a resource index number corresponding to the determined PUCCH resource included in higher layer signaling respectively to the each RN device to instruct the RN device to determine the PUCCH resource, over which uplink feedback information is transmitted, according to the resource index number.

An embodiment of the invention provides another method for transmitting uplink feedback information, which includes:

a Relay Node, RN, receiving a resource index number transmitted from a base station and determining a corresponding Physical Uplink Control Channel, PUCCH, resource; and the RN device transmitting uplink feedback information over the determined PUCCH resource.

An embodiment of the invention provides a system for transmitting uplink feedback information, which includes:

a base station configured to select from a pool of Physical Uplink Control Channel, PUCCH, resources at least one dedicated PUCCH resource for each Relay Node, RN, device served by the base station and to transmit a resource index number corresponding to the determined PUCCH resource included in higher layer signaling respectively to the each RN device; and the RN device configured to determine the PUCCH resource according to the resource index number and to transmit uplink feedback information over the determined PUCCH resource.

An embodiment of the invention provides a base station including:

a selection module configured to select from a pool of Physical Uplink Control Channel, PUCCH, resources at least one dedicated PUCCH resource for each Relay Node, RN, device served by the base station;

an index number transmission module configured to transmit a resource index number corresponding to the determined PUCCH resource included in higher layer signaling respectively to the each RN device to instruct the RN device to determine the PUCCH resource according to the resource index number and to transmit uplink feedback information over the determined PUCCH resource.

An embodiment of the invention provides a Relay Node, RN, device including:

a resource determination module configured to determine a corresponding Physical Uplink Control Channel, PUCCH, resource according to a received resource index number from a base station; and a feedback module configured to transmit uplink feedback information over the PUCCH resource determined by the resource determination module.

In the embodiments of the invention, a base station selects at least one dedicated PUCCH resource from a pool of PUCCH resources and transmits higher layer signaling including a resource index number corresponding to the PUCCH resource to an RN device over a backhaul link, and the RN device determines the PUCCH resource according to the resource index number and transmits uplink feedback information over the determined PUCCH resource. With the solution to allocation of a PUCCH resource to a relay node device in an LTE-A system, the relay node device can transmit uplink feedback information over the allocated PUCCH resource; and furthermore the utilization of resources for and the reliability of network transmission can be improved.

DETAILED DESCRIPTION OF THE EMBODIMENTS

In embodiments of the invention, a base station selects from a pool of PUCCH resources at least one dedicated PUCCH resource for each RN device served by the base station and transmits a resource index number corresponding to the determined PUCCH resource included in higher layer signaling respectively to the each RN device, and the RN device determines the PUCCH resource according to the resource index number and transmits uplink feedback information over the determined PUCCH resource. The embodiments of the invention provide a solution to allocation of a PUCCH resource to a relay node device in an LTE-A system so that the relay node device can transmit uplink feedback information over the allocated PUCCH resource.

Figure 1:
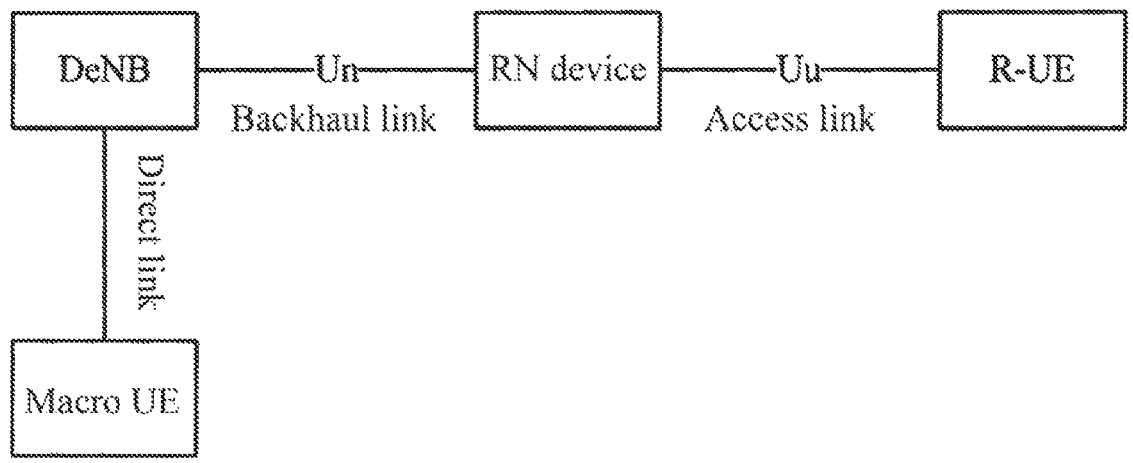
FIG. 1 is a schematic structural diagram of an LTE-A system according to an embodiment of the invention.
Figure 2:
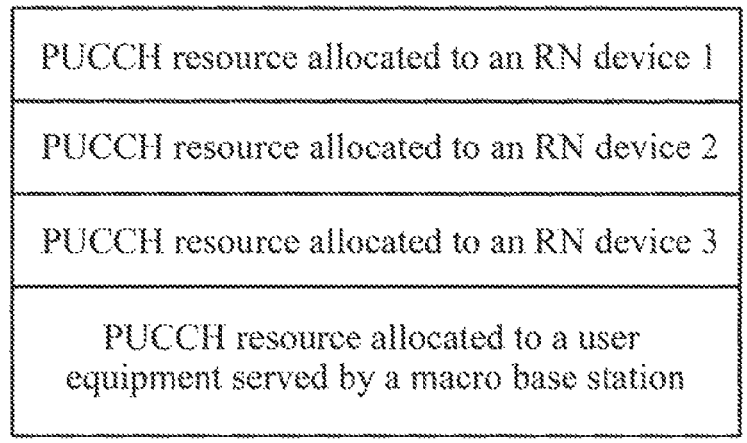
FIG. 2 is a schematic diagram of allocated PUCCH resources according to an embodiment of the invention.

Particularly the dedicated PUCCH resource in the embodiments of the invention is a part of PUCCH resources in the pool of PUCCH resources, this part of the PUCCH resources is allocable only to an RN device, and a PUCCH resource corresponding to a resource index number is a resource over which uplink feedback information of an RN device is transmitted, that is, apart of the PUCCH resources allocated to one RN device can not be allocated to another RN device or a macro user equipment. As illustrated in FIG. 2, assumed that there are three RN devices, each of which corresponds to a different PUCCH resource unavailable to a macro user equipment, and the remaining PUCCH resources are available to a user equipment served by a macro base station, that is, can be multiplexed for the user equipment served by the macro base station.

The embodiments of the invention will be further detailed below with reference to the drawings.

Figure 3:
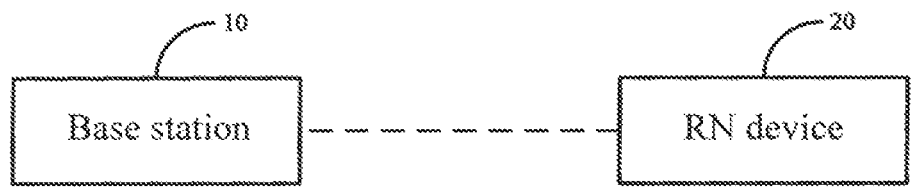
FIG. 3 is a schematic structural diagram of a system for transmitting uplink feedback information according to an embodiment of the invention.

As illustrated in FIG. 3, a system for transmitting uplink feedback information according to an embodiment of the invention includes abase station 10 and an RN device 20.

The base station 10 is configured to select from a pool of PUCCH resources at least one dedicated PUCCH resource for each RN device served by the base station and to transmit a resource index number corresponding to the determined PUCCH resource included in higher layer signaling respectively to the each RN device.

The RN device 20 is configured to determine the PUCCH resource according to the received resource index number from the base station 10 and to transmit uplink feedback information over the determined PUCCH resource.

Specifically the RN device 20 can transmit uplink feedback information in the PUCCH format 1a or 1b in the Third Generation Partnership Project Technical Specification (3GPP TS) 36.211 standard.

The base station 10 selects a different PUCCH resource for each RN device served by the base station, where uplink feedback information transmitted from the RN device is transmitted over the selected PUCCH resource for the RN device.

Specifically the base station 10 can determine the number of PUCCH resources required for the RN device 20 according to the number of downlink transmission codewords and a transmission scheme of uplink feedback information, the base station 10 selects from the pool of PUCCH resources at least one dedicated PUCCH resource for the RN device 20 according to the determined number, and the base station 10 transmits higher layer signaling including a resource index number corresponding to the PUCCH resource to the corresponding RN device 20 over a backhaul link.

Since a plurality of RN devices may be connected with the base station 10, the base station 10 will select a PUCCH resource for each RN device 20 and then transmit a resource index number corresponding to the selected PUCCH resource to the corresponding RN device 20, for example, transmit a PUCCH resource allocated for an RN device 1 to the RN device 1.

For example, the base station 10 can signal the index number of the PUCCH resource to the RN device 20 in Radio Resource Control (RRC) signaling. It shall be noted that higher layer signaling used for the base station 10 will not be limited to RRC signaling, but any higher layer signaling in which an index number of a PUCCH resource can be borne will be applicable in the embodiment of the invention.

Furthermore a PUCCH resource can be reconfigured, and when a PUCCH resource is reconfigured, the base station 10 transmits higher layer signaling including a resource index number corresponding to a new PUCCH resource to the RN device over the backhaul link. The PUCCH resource allocated to the RN device 20 will not be changed in an active period of higher layer signaling until the higher layer signaling including the resource index number corresponding to the new PUCCH resource is received.

Particularly in different sub-frame configurations of the backhaul link, one uplink sub-frame over the backhaul link may correspond to one downlink sub-frame (that is, uplink feedback information corresponding to a downlink transmission codeword transmitted in only one downlink sub-frame is transmitted in one uplink sub-frame over the backhaul link) or a plurality of downlink sub-frames (that is, uplink feedback information corresponding to downlink transmission codewords transmitted in a plurality of downlink sub-frames is transmitted in one uplink sub-frame over the backhaul link), both of which will be described respectively below.

In a first scenario, there is one downlink sub-frame corresponding to one uplink sub-frame over the backhaul link.

In this scenario, the base station 10 can select from the pool of PUCCH resources one dedicated PUCCH resource respectively for each RN device served by the base station 10 (that is, connected with the base station 10).

The base station 10 can alternatively determine the number of PUCCH resources corresponding to the RN device 20 according to the number of downlink transmission codewords transmitted in a downlink sub-frame of the backhaul link and a modulation order at which the RN device modulates uplink feedback information and select a dedicated PUCCH resource from the pool of PUCCH resources respectively for each RN device in a macro cell according to the determined number.

Specifically the base station 10 divides the number of downlink transmission codewords by the number of bits required for modulation into one modulation symbol, and if the resulting value is an integer, then the value is taken as the number of PUCCH resource; or if the resulting value is not an integer, then the value is rounded up and taken as the number of PUCCH resource. For example, the number of downlink transmission codewords transmitted in the downlink is M, and a number N of bits are modulated into one modulation symbol, and if M is an integer multiple of N, then the number of required PUCCH resources is $$n = \frac{M}{N};$$

or if M is not an integer multiple of N, then the number of required PUCCH resources is $$n = \left\lceil \frac{M}{N} \right\rceil.$$

For example, the base station 10 determines the number of PUCCH resources corresponding to the RN device as X according to the number of downlink transmission codewords transmitted in a downlink sub-frame of the backhaul link and a modulation order at which the RN device modulates uplink feedback information, and then the base station 10 will select from the pool of PUCCH resources a number X of dedicated PUCCH resources respectively for each RN device.

Correspondingly the RN device 20 determines a corresponding PUCCH resource in an uplink sub-frame of the backhaul link according to the received resource index number, receives at least one downlink transmission codeword in a downlink sub-frame of the backhaul link, then determines uplink feedback information corresponding to each downlink transmission codeword transmitted in the downlink sub-frame and transmits the uplink feedback information corresponding to the downlink transmission codeword over the PUCCH resource, in the uplink sub-frame of the backhaul link, corresponding to the downlink sub-frame.

If the RN device 20 receives one or more resource index numbers and the base station 10 transmits one downlink transmission codeword to the RN device 20 in a downlink sub-frame of the backhaul link, then the RN device 20 determines uplink feedback information corresponding to the downlink transmission codeword transmitted in the downlink sub-frame (that is, one bit is occupied for the uplink feedback information), and next the RN device 20 will perform Binary Phase Shift Keying (BPSK) modulation on the uplink feedback information to form one modulation symbol and then perform time-domain and frequency-domain extension and other operations and next transmit the uplink feedback information corresponding to the downlink transmission codeword over the PUCCH resource, in the uplink sub-frame of the backhaul link, corresponding to the downlink sub-frame.

If the RN device 20 receives one resource index number and the base station 10 transmits a plurality of downlink transmission codewords to the RN device 20 in a downlink sub-frame of the backhaul link, then the RN device 20 determines uplink feedback information corresponding to the downlink transmission codewords transmitted in the downlink sub-frame (that is, at least two bits are occupied for the uplink feedback information), and next the RN device 20 will perform high-order modulation (for example, the scheme of Quadrature Phase Shift Keying (QPSK) to support two downlink transmission codewords, Quadrature Amplitude Modulation (16QAM) to support four downlink transmission codewords, etc.) on the uplink feedback information to form one modulation symbol and then perform time-domain and frequency-domain extension and other operations and next transmit the uplink feedback information corresponding to the downlink transmission codewords over the PUCCH resource, in the uplink sub-frame of the backhaul link, corresponding to the downlink sub-frame.

If the RN device 20 receives a plurality of resource index numbers and the base station 10 transmits a plurality of downlink transmission codewords to the RN device 20 in a downlink sub-frame of the backhaul link, then the RN device 20 will allot corresponding resource index numbers for the downlink transmission codewords. For example, two resource index numbers are received to support four downlink transmission codewords, and the RN device 20 will allocate one resource index number to uplink feedback information corresponding to two downlink transmission codewords and then perform QPSK modulation on the uplink feedback information corresponding to the two downlink transmission codewords to form two modulation symbols, and then the RN device performs time-domain and frequency-domain extension and other operations on the two modulation symbols and next transmits the uplink feedback information respectively over the PUCCH resources corresponding to the resource index numbers.

In a second scenario, there are a plurality of downlink sub-frames corresponding to one uplink sub-frame over the backhaul link.

This scenario is further divided into three schemes.

In a first scheme, a plurality of PUCCH resources are allocated.

The base station 10 selects from the pool of PUCCH resources a number M of dedicated PUCCH resources respectively for each RN device served by the base station, where M is equal to the number of downlink sub-frames corresponding to one uplink sub-frame over the backhaul link.

Correspondingly the RN device 20 determines a number M of PUCCH resources, in an uplink sub-frame of the backhaul link corresponding to a number M of resource index numbers, determines a correspondence relationship between the PUCCH resources of the uplink sub-frame and respective downlink sub-frames corresponding to the uplink sub-frame and receives at least one downlink transmission codeword in a downlink sub-frame of the backhaul link and then determines uplink feedback information corresponding to each downlink transmission codeword transmitted in each downlink sub-frame and performs modulation, extension and other operations on the uplink feedback information corresponding to a downlink transmission codeword transmitted in the downlink sub-frame and next transmits the uplink feedback information of the downlink sub-frame over the PUCCH resource, in the uplink sub-frame of the backhaul link; corresponding to the downlink sub-frame.

Specifically the RN device 20 determines a number M of corresponding PUCCH resources in each uplink sub-frame according to the number M of resource index numbers; and each sub-frame corresponds to a number M of downlink sub-frames, and there are a number M of PUCCH resources in an uplink sub-frame, so each downlink sub-frame will correspond to one PUCCH resource.

For example the RN device 20 can determine the specific corresponding PUCCH resources in the order that the downlink sub-frames are numbered, for example, a first one of the downlink sub-frames corresponding to the same uplink sub-frame corresponds to a first one of the PUCCH resources in the uplink sub-frame in the order that the sub-frames are numbered.

The RN device 20 can alternatively determine randomly a PUCCH resource corresponding to a downlink sub-frame.

It shall be noted that the embodiment of the invention will not be limited to the foregoing method for determining the correspondence relationship, and an alternative method will be applicable in the embodiment of the invention as long as correspondence of a PUCCH resource to a unique downlink sub-frame can be ensured.

The RN device 20 receives at least one downlink transmission codeword in a downlink sub-frame of the backhaul link and then determines uplink feedback information corresponding to each downlink transmission codeword transmitted in each downlink sub-frame. If two downlink transmission codewords are transmitted in a downlink sub-frame, then each downlink sub-frame will correspond to two pieces of uplink feedback information, that is, the RN device 20 will determine one piece of uplink feedback information as a result of decoding each downlink transmission codeword.

Then the RN device 20 performs high-order modulation on the uplink feedback information corresponding to the downlink transmission codeword transmitted in one downlink sub-frame to form one modulation symbol. A specific modulation scheme thereof is the same as the modulation scheme in the first scenario, and a repeated description thereof will be omitted here.

In an implementation, the RN device 20 can further perform a logic addition process on and then modulate all the uplink feedback information corresponding to the downlink transmission codewords transmitted in one downlink sub-frame.

Finally the RN device 20 transmits the uplink feedback information corresponding to the downlink transmission codeword over the PUCCH resource, in the uplink sub-frame of the backhaul link, corresponding to the downlink sub-frame.

In a second scheme, uplink feedback information is bound.

The base station 10 selects from the pool of PUCCH resources one dedicated PUCCH resource respectively for each RN device served by the base station.

Correspondingly the RN device 20 determines a corresponding PUCCH resource in an uplink sub-frame of the backhaul link according to the received resource index number, receives at least one downlink transmission codeword in a downlink sub-frame of the backhaul link and then determines uplink feedback information corresponding to each downlink transmission codeword transmitted in each downlink sub-frame, adds up logically the uplink feedback information corresponding to the same downlink transmission codewords transmitted in all the downlink sub-frames corresponding to the same uplink sub-frame of the backhaul link and transmits the logically added-up uplink feedback information over the PUCCH resource in the uplink sub-frame of the backhaul link.

Specifically the RN device 20 determines one corresponding PUCCH resource in each uplink sub-frame according to the resource index number.

The RN device 20 receives at least one downlink transmission codeword in a downlink sub-frame of the backhaul link and then determines uplink feedback information corresponding to each downlink transmission codeword transmitted in each downlink sub-frame.

Then the RN device 20 further determines among the determined uplink feedback information the uplink feedback information corresponding to the same downlink transmission codewords transmitted in downlink sub-frames corresponding to the same uplink sub-frame of the backhaul line.

The RN device 20 adds up logically the uplink feedback information corresponding to the same downlink transmission codewords transmitted in the downlink sub-frames corresponding to the same uplink sub-frame of the backhaul line.

Since the respective downlink sub-frames subject to logical addition correspond to the same uplink sub-frame, the RN device 20 transmits the logically added-up uplink feedback information over the PUCCH resource in the uplink sub-frame (i.e., the PUCCH resource corresponding to the received resource index).

In a third scheme, uplink feedback information is multiplexed.

The base station 10 selects from the pool of PUCCH resources a number M of dedicated PUCCH resources respectively for each RN device served by the base station, where M is equal to the number of downlink sub-frames corresponding to one uplink sub-frame over the backhaul link.

Particularly the base station 10 selects a resource index number in the third scheme as the base station 10 selects a resource index number in the first scheme, and a repeated description thereof will be omitted here.

Correspondingly the RN device 20 determines a number M of PUCCH resources, in the uplink sub-frame of the backhaul link, corresponding to a number M of resource index numbers, receives at least one downlink transmission codeword in a downlink sub-frame of the backhaul link and then determines uplink feedback information corresponding to each downlink transmission codeword transmitted in each downlink sub-frame, adds up logically all the uplink feedback information corresponding to the downlink transmission codewords transmitted in the same downlink sub-frame, determines bit information and one of the received M resource index numbers according to the number of downlink sub-frames corresponding to the uplink sub-frame and the logically added-up uplink feedback information of each downlink sub-frame corresponding to the uplink sub-frame, takes the determined bit information as uplink feedback information to be transmitted and transmits the uplink feedback information to be transmitted over the PUCCH resource, in the uplink sub-frame, corresponding to the determined resource index number.

Specifically the RN device 20 determines a number M of PUCCH resources in each uplink sub-frame according to the number M of resource index numbers.

The RN device 20 receives at least one downlink transmission codeword in a downlink sub-frame of the backhaul link and then determines uplink feedback information corresponding to each downlink transmission codeword transmitted in each downlink sub-frame Then the RN device 20 adds up logically all the uplink feedback information corresponding to the same downlink sub-frame.

The RN device 20 determines bit information and one of the received M resource index numbers according to the number of downlink sub-frames corresponding to an uplink sub-frame and the logically added-up uplink feedback information of each downlink sub-frame corresponding to the uplink sub-frame.

If there is a downlink sub-frame in which a downlink transmission codeword is not transmitted, then the RN device 20 marks this part of downlink sub-frames as Discrete Transmission (DTX). Correspondingly the RN device 20 determines bit information and one of the received M resource index numbers according to the number of downlink sub-frames corresponding to an uplink sub-frame, the logically added-up uplink feedback information of each downlink sub-frame corresponding to the uplink sub-frame (the logic sum thereof of 1 indicates ACK, and this sum of 0 indicates NACK) and the DTX of the downlink sub-frames corresponding to the uplink sub-frame.

In a specific implementation, the RN device 20 can determine bit information and one of the received M resource index numbers according to Tables 1 to 3.

TABLE 1

Multiplexed transmission of ACK/NACK with a number 2 of downlink sub-frames corresponding to an uplink sub-frame

| HARQ-ACK(0), HARQ-ACK(1) (logically added-up uplink feedback information) | $n_{PUCCH}^{(1)}$ (resource index number) | b(0), b(1) (bit information) |
|---|---|---|
| ACK, ACK | $n_{PUCCH,1}^{(1)}$ | 1, 1 |
| ACK, NACK/DTX | $n_{PUCCH,0}^{(1)}$ | 0, 1 |
| NACK/DTX, ACK | $n_{PUCCH,1}^{(1)}$ | 0, 0 |
| NACK/DTX, NACK | $n_{PUCCH,1}^{(1)}$ | 1, 0 |
| NACK, DTX | $n_{PUCCH,0}^{(1)}$ | 1, 0 |
| DTX, DTX | N/A | N/A |

TABLE 2

Multiplexed transmission of ACK/NACK with a number 3 of downlink sub-frames corresponding to an uplink sub-frame

| HARQ-ACK(0), HARQ-ACK(1), HARQ-ACK(2) | $n_{PUCCH}^{(1)}$ | b(0), b(1) |
|---|---|---|
| ACK, ACK, ACK | $n_{PUCCH,2}^{(1)}$ | 1, 1 |
| ACK, ACK, NACK/DTX | $n_{PUCCH,1}^{(1)}$ | 1, 1 |
| ACK, NACK/DTX, ACK | $n_{PUCCH,0}^{(1)}$ | 1, 1 |
| ACK, NACK/DTX, NACK/DTX | $n_{PUCCH,0}^{(1)}$ | 0, 1 |
| NACK/DTX, ACK, ACK | $n_{PUCCH,2}^{(1)}$ | 1, 0 |
| NACK/DTX, ACK, NACK/DTX | $n_{PUCCH,1}^{(1)}$ | 0, 0 |
| NACK/DTX, NACK/DTX, ACK | $n_{PUCCH,2}^{(1)}$ | 0, 0 |
| DTX, DTX, NACK | $n_{PUCCH,2}^{(1)}$ | 0, 1 |
| DTX, NACK, NACK/DTX | $n_{PUCCH,1}^{(1)}$ | 1, 0 |
| NACK, NACK/DTX, NACK/DTX | $n_{PUCCH,0}^{(1)}$ | 1, 0 |
| DTX, DTX, DTX | N/A | N/A |

TABLE 3

Multiplexed transmission of ACK/NACK with a number 4 of downlink sub-frames corresponding to an uplink sub-frame

| HARQ-ACK(0), HARQ-ACK(1), HARQ-ACK(2), HARQ-ACK(3) | $n_{PUCCH}^{(1)}$ | b(0), b(1) |
|---|---|---|
| ACK, ACK, ACK, ACK | $n_{PUCCH,1}^{(1)}$ | 1, 1 |
| ACK, ACK, ACK, NACK/DTX | $n_{PUCCH,1}^{(1)}$ | 1, 0 |
| NACK/DTX, NACK/DTX, NACK, DTX | $n_{PUCCH,2}^{(1)}$ | 1, 1 |
| ACK, ACK, NACK/DTX, ACK | $n_{PUCCH,1}^{(1)}$ | 1, 0 |
| NACK, DTX, DTX, DTX | $n_{PUCCH,0}^{(1)}$ | 1, 0 |
| ACK, ACK, NACK/DTX, NACK/DTX | $n_{PUCCH,1}^{(1)}$ | 1, 0 |
| ACK, NACK/DTX, ACK, ACK | $n_{PUCCH,3}^{(1)}$ | 0, 1 |
| NACK/DTX, NACK/DTX, NACK/DTX, NACK | $n_{PUCCH,3}^{(1)}$ | 1, 1 |
| ACK, NACK/DTX, ACK, NACK/DTX | $n_{PUCCH,2}^{(1)}$ | 0, 1 |
| ACK, NACK/DTX, NACK/DTX, ACK | $n_{PUCCH,0}^{(1)}$ | 0, 1 |
| ACK, NACK/DTX, NACK/DTX, NACK/DTX | $n_{PUCCH,0}^{(1)}$ | 1, 1 |
| NACK/DTX, ACK, ACK, ACK | $n_{PUCCH,3}^{(1)}$ | 0, 1 |
| NACK/DTX, NACK, DTX, DTX | $n_{PUCCH,1}^{(1)}$ | 0, 0 |
| NACK/DTX, ACK, ACK, NACK/DTX | $n_{PUCCH,2}^{(1)}$ | 1, 0 |
| NACK/DTX, ACK, NACK/DTX, ACK | $n_{PUCCH,3}^{(1)}$ | 1, 0 |
| NACK/DTX, ACK, NACK/DTX, NACK/DTX | $n_{PUCCH,1}^{(1)}$ | 0, 1 |
| NACK/DTX, NACK/DTX, ACK, ACK | $n_{PUCCH,3}^{(1)}$ | 0, 1 |
| NACK/DTX, NACK/DTX, ACK, NACK/DTX | $n_{PUCCH,2}^{(1)}$ | 0, 0 |
| NACK/DTX, NACK/DTX, NACK/DTX, ACK | $n_{PUCCH,3}^{(1)}$ | 0, 0 |
| DTX, DTX, DTX, DTX | N/A | N/A |

Since both the bit information and the resource index number is determined according to the downlink sub-frames corresponding to the same uplink sub-frame, the RN device 20 takes the bit information as uplink feedback information to be transmitted and transmits the uplink feedback information to be transmitted over the PUCCH resource, in the same uplink sub-frame, corresponding to the resource index number.

Figure 4:
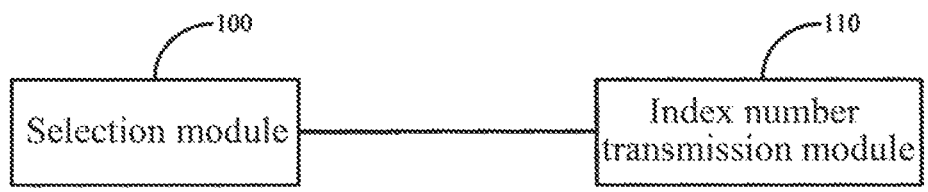
FIG. 4 is a schematic structural diagram of a base station according to an embodiment of the invention.

As illustrated in FIG. 4, a base station according to an embodiment of the invention includes a selection module 100 and an index number transmission module 110.

The selection module 100 is configured to select from a pool of Physical Uplink Control Channel (PUCCH) resources at least one dedicated PUCCH resource for each Relay Node (RN) device served by the base station.

The index number transmission module 110 is configured to transmit a resource index number corresponding to the determined PUCCH resource included in higher layer signaling respectively to the each RN device to instruct the RN device to determine the PUCCH resource according to the resource index number and to transmit uplink feedback information over the determined PUCCH resource.

The selection module 100 can select a different PUCCH resource for each RN device served by the base station, where uplink feedback information transmitted from the RN device is transmitted over the selected PUCCH resource of the RN device.

The index number transmission module 110 can transmit the higher layer signaling including the resource index number corresponding to the PUCCH resource periodically to the RN device over a backhaul link.

If there is one downlink sub-frame corresponding to one uplink sub-frame over the backhaul link, then the selection module 100 selects from the pool of PUCCH resources one dedicated PUCCH resource respectively for each RN device served by the base station; or The selection module 100 determines the number of PUCCH resources corresponding to the RN device according to the number of downlink transmission codewords transmitted in a downlink sub-frame of the backhaul link and a modulation order at which the RN device modulates uplink feedback information, and selects a dedicated PUCCH resource from the pool of PUCCH resources respectively for each RN device in a macro cell according to the determined number.

If there are a plurality of downlink sub-frames corresponding to one uplink sub-frame over the backhaul link, then the selection module 100 selects from the pool of PUCCH resources a number M of dedicated PUCCH resources respectively for each RN device served by the base station, where M is equal to the number of downlink sub-frames corresponding to one uplink sub-frame over the backhaul link; or The selection module 100 selects from the pool of PUCCH resources one dedicated PUCCH resource respectively for each RN device served by the base station.

Figure 5:
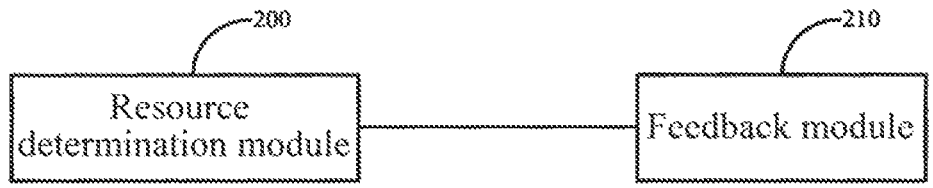
FIG. 5 is a schematic structural diagram of an RN device according to an embodiment of the invention.

As illustrated in FIG. 5, an RN device according to an embodiment of the invention includes a resource determination module 200 and a feedback module 210.

The resource determination module 200 is configured to determine a corresponding PUCCH resource according to a received resource index number from a base station; and The feedback module 210 is configured to transmit uplink feedback information over the PUCCH resource determined by the resource determination module 200.

If there is one downlink sub-frame corresponding to one uplink sub-frame over a backhaul link, then the resource determination module 200 determines a corresponding PUCCH resource in an uplink sub-frame of the backhaul link according to the received resource index number from the base station; and Correspondingly the feedback module 210 receives at least one downlink transmission codeword in a downlink sub-frame of the backhaul line and then determines uplink feedback information corresponding to each downlink transmission codeword transmitted in the downlink sub-frame and transmits the determined uplink feedback information corresponding to the downlink transmission codeword over the PUCCH resource, in the uplink sub-frame of the backhaul link, corresponding to the downlink sub-frame.

If there are a plurality of downlink sub-frames corresponding to one uplink sub-frame over a backhaul link, then the resource determination module 200 receives a number M of resource index numbers from the base station and then determines a number M of PUCCH resources, in an uplink sub-frame of the backhaul link, corresponding to the number M of resource index numbers and determines a correspondence relationship between the PUCCH resources of the uplink sub-frame and respective downlink sub-frames corresponding to the uplink sub-frame, where M is equal to the number of downlink sub-frames corresponding to one uplink sub-frame over the backhaul link; and Correspondingly the feedback module 210 receives at least one downlink transmission codeword in a downlink sub-frame of the backhaul link and then determines uplink feedback information corresponding to each downlink transmission codeword transmitted in each downlink sub-frame and performs high-order modulation on the uplink feedback information corresponding to the downlink transmission codeword transmitted in the one downlink sub-frame to form one modulation symbol, then performs time-domain and frequency domain extension and other operations and next transmits the determined uplink feedback information corresponding to the downlink transmission codeword over the PUCCH resource, in the uplink sub-frame of the backhaul link, corresponding to the downlink sub-frame.

If there are a plurality of downlink sub-frames corresponding to one uplink sub-frame over a backhaul link, then the resource determination module 200 receives one resource index number from the base station and then determines one corresponding PUCCH resource in an uplink sub-frame of the backhaul link according to the received resource index number; and Correspondingly the feedback module 210 receives at least one downlink transmission codeword in a downlink sub-frame of the backhaul link and then determines uplink feedback information corresponding to each downlink transmission codeword transmitted in each downlink sub-frame, adds up logically the uplink feedback information corresponding to the same downlink transmission codewords transmitted in all the downlink sub-frames corresponding to the same uplink sub-frame of the backhaul link and transmits the logically added-up uplink feedback information over the PUCCH resource in the uplink sub-frame of the backhaul link.

If there are a plurality of downlink sub-frames corresponding to one uplink sub-frame over a backhaul link, then the resource determination module 200 receives a number M of resource index numbers from the base station and then determines a number M of PUCCH resources, in an uplink sub-frame of the backhaul link, corresponding to the number M of resource index numbers, where M is equal to the number of downlink sub-frames corresponding to one uplink sub-frame over the backhaul link; and Correspondingly the feedback module 210 receives at least one downlink transmission codeword in a downlink sub-frame of the backhaul link and then determines uplink feedback information corresponding to each downlink transmission codeword transmitted in each downlink sub-frame, logically adds up all the uplink feedback information corresponding to the downlink transmission codewords transmitted in the same downlink sub-frame, determines bit information and one of the received M resource index numbers according to the number of downlink sub-frames corresponding to an uplink sub-frame and the logically added-up uplink feedback information of each downlink sub-frame corresponding to the uplink sub-frame, takes the determined bit information as uplink feedback information to be transmitted and transmits the uplink feedback information to be transmitted over the PUCCH resource, in the uplink sub-frame, corresponding to the determined resource index number.

Figure 6:
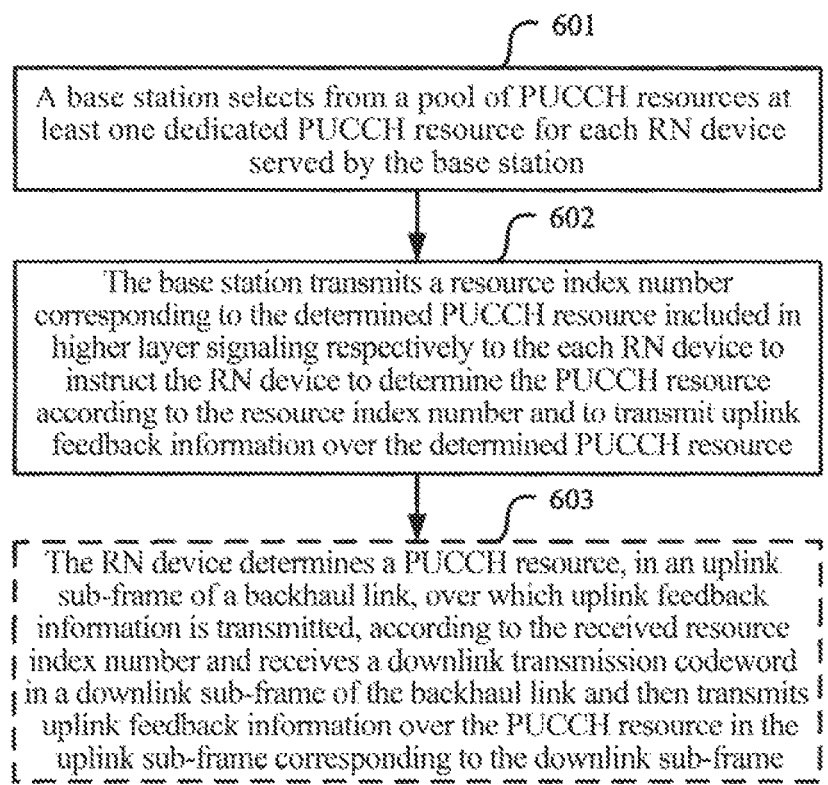
FIG. 6 is a schematic flow chart of a method for transmitting uplink feedback information according to an embodiment of the invention.

As illustrated in FIG. 6, a method for transmitting uplink feedback information according to an embodiment of the invention includes:

In the step 601, a base station selects from a pool of PUCCH resources at least one dedicated PUCCH resource for each RN device served by the base station.

In the step 602, the base station transmits a resource index number corresponding to the determined PUCCH resource included in higher layer signaling respectively to the each RN device to instruct the RN device to determine the PUCCH resource according to the resource index number and to transmit uplink feedback information over the determined PUCCH resource.

Further In the step 603:

The RN device determines a PUCCH resource, in an uplink sub-frame of a backhaul link, over which uplink feedback information is transmitted, according to the received resource index number and receives a downlink transmission codeword in a downlink sub-frame of the backhaul link and then transmits uplink feedback information over the PUCCH resource in the uplink sub-frame corresponding to the downlink sub-frame.

Specifically the RN device can transmit uplink feedback information in the PUCCH format 1a or 1b in the 3GPP TS 36.211 standard in the step 603.

The base station selects a different PUCCH resource for each RN device served by the base station, where uplink feedback information transmitted from the RN device is transmitted over the selected PUCCH resource of the RN device.

Specifically the base station can determine the number of PUCCH resources required for the RN device according to the number of downlink transmission codewords and a transmission scheme of uplink feedback information, and the base station selects from the pool of PUCCH resources at least one dedicated PUCCH resource for the RN device according to the determined number The base station transmits higher layer signaling including a resource index number corresponding to the PUCCH resource to the corresponding RN device over a backhaul link in the step 601.

Since a plurality of RN devices may be connected with the base station, the base station will select a PUCCH resource for each RN device in the step 601, and then the base station will transmit a resource index number corresponding to the selected PUCCH resource to the corresponding RN device in the step 602, for example, transmit a PUCCH resource allocated for an RN device 1 to the RN device 1.

Furthermore a PUCCH resource can be reconfigured, and when a. PUCCH resource is reconfigured, the base station 10 transmits higher layer signaling including a resource index number corresponding to a new PUCCH resource to the RN device over the backhaul link. The PUCCH resource allocated to the RN device 20 will not be changed in an active period of higher layer signaling until the higher layer signaling including the resource index number corresponding to the new PUCCH resource is received.

Particularly in different sub-frame configurations of the backhaul link, one uplink sub-frame over the backhaul link may correspond to one downlink sub-frame (that is, uplink feedback information corresponding to a downlink transmission codeword transmitted in only one downlink sub-frame is transmitted in one uplink sub-frame over the backhaul link) or a plurality of downlink sub-frames (that is, uplink feedback information corresponding to downlink transmission codewords transmitted in a plurality of downlink sub-frames is transmitted in one uplink sub-frame over the backhaul link), both of which will be described respectively below.

In a first scenario, there is one downlink sub-frame corresponding to one uplink sub-frame over the backhaul link.

In this scenario, the base station can select from the pool of PUCCH resources one dedicated PUCCH resource respectively for each RN device served by the base station (that is, connected with the base station) in the step 601.

The base station can alternatively determine the number of PUCCH resources corresponding to the RN device according to the number of downlink transmission codewords transmitted in a downlink sub-frame of the backhaul link and a modulation order at which the RN device modulates uplink feedback information and select a dedicated PUCCH resource from the pool of PUCCH resources respectively for each RN device in a macro cell according to the determined number in the step 601.

Specifically the base station divides the number of downlink transmission codewords by the number of bits required for modulation into one modulation symbol, and if the resulting value is an integer, then the value is taken as the number of PUCCH resource; or if the resulting value is not an integer, then the value is rounded up and taken as the number of PUCCH resource. For example, the number of downlink transmission codewords transmitted in the downlink is M, and a number N of bits are modulated into one modulation symbol, and if M is an integer multiple of N, then the number of required PUCCH resources is $$n = \frac{M}{N};$$

or of if M is not an integer multiple of N, then the number of required PUCCH resources is $$n = \left\lceil \frac{M}{N} \right\rceil.$$

Correspondingly the RN device determines the corresponding PUCCH resource in the uplink sub-frame of the backhaul link according to the received resource index number and receives at least one downlink transmission codeword in a downlink sub-frame of the backhaul link and then determines uplink feedback information corresponding to the downlink transmission codeword transmitted in the downlink sub-frame and transmits the uplink feedback information corresponding to the downlink transmission codeword over the PUCCH, resource, in the uplink sub-frame of the backhaul link, corresponding to the downlink sub-frame in the step 603.

If the RN device receives one or more resource index numbers and the base station transmits one downlink transmission codeword to the RN device in a downlink sub-frame of the backhaul link, then the RN device determines plink feedback information corresponding to the downlink transmission codeword transmitted in the downlink sub-frame (that is, one bit is occupied for the uplink feedback information), and next the RN device will perform BPSK modulation on the uplink feedback information to form one modulation symbol and then perform time-domain and frequency-domain extension and other operations and next transmit the uplink feedback information corresponding to the downlink transmission codeword over the PUCCH resource, in the uplink sub-frame of the backhaul link, corresponding to the downlink sub-frame.

If the RN device receives one resource index number and the base station transmits a plurality of downlink transmission codewords to the RN device in a downlink sub-frame of the backhaul link, then the RN device determines uplink feedback information corresponding to the downlink transmission codewords transmitted in the downlink sub-frame (that is, at least two bits are occupied for the uplink feedback information), and next the RN device will perform high-order modulation (for example, the scheme of QPSK to support two downlink transmission codewords, 16QAM to support four downlink transmission codewords, etc.) on the uplink feedback information to form one modulation symbol and then perform time-domain and frequency-domain extension and other operations and next transmit the uplink feedback information corresponding to the downlink transmission codewords over the PUCCH resource, in the uplink sub-frame of the backhaul link, corresponding to the downlink sub-frame.

If the RN device receives a plurality of resource index numbers and the base station transmits a plurality of downlink transmission codewords to the RN device in a downlink sub-frame of the backhaul link, then the RN device will allot corresponding resource index numbers for the downlink transmission codewords. For example, two resource index numbers are received to support four downlink transmission codewords, and the RN device will allocate one resource index number corresponding to uplink feedback information corresponding to two downlink transmission codewords and then perform QPSK modulation on the uplink feedback information corresponding to the two downlink transmission codewords to form two modulation symbols, and then the RN device performs time-domain and frequency-domain extension and other operations on the two modulation symbols and next transmits the uplink feedback information respectively over the PUCCH resources corresponding to the resource index numbers.

In a second scenario, feedback information corresponding to downlink data in a plurality of downlink sub-frames will be transmitted in one uplink sub-frame over the backhaul link.

This scenario is further divided into three schemes.

In a first scheme, a plurality of PUCCH resources are allocated.

The base station selects from the pool of PUCCH resources a number M of dedicated PUCCH resources respectively for each RN device served by the base station in the step 601, where M is equal to the number of downlink sub-frames corresponding to one uplink sub-frame over the backhaul link.

Correspondingly the RN device determines a number M of PUCCH resources, in an uplink sub-frame of the backhaul link, corresponding to a number M of resource index numbers, determines a correspondence relationship between the PUCCH resources of the uplink sub-frame and respective downlink sub-frames corresponding to the uplink sub-frame and receives at least one downlink transmission codeword in a downlink sub-frame of the backhaul link and then determines uplink feedback information corresponding to each downlink transmission codeword transmitted in each downlink sub-frame and performs modulation, extension and other operations on the uplink feedback information corresponding to the downlink transmission codeword transmitted in the downlink sub-frame and next transmits the uplink feedback information of the downlink sub-frame over the PUCCH resource, in the uplink sub-frame of the backhaul link, corresponding to the downlink sub-frame in the step 602.

Specifically the RN device determines a number M of corresponding PUCCH resources in each uplink sub-frame according to the number M of resource index numbers; and an uplink sub-frame corresponds to a number M of downlink sub-frames, and there are a number M of PUCCH resources in an uplink sub-frame, so each downlink sub-frame will correspond to one PUCCH resource.

For example the RN device can determine the specific corresponding PUCCH resources in the order that the downlink sub-frames are numbered, for example, a first one of the downlink sub-frames corresponding to the same uplink sub-frame corresponds to a first one of the PUCCH resources in the uplink sub-frame in the order that the sub-frames are numbered.

The RN device can alternatively determine randomly a PUCCH resource corresponding to a downlink sub-frame.

It shall be noted that the of embodiment of the invention will not be limited to the foregoing method for determining the correspondence relationship, and an alternative method will be applicable in the embodiment of the invention as long as correspondence of a PUCCH resource to a unique downlink sub-frame can be ensured.

The RN device receives at least one downlink transmission codeword in a downlink sub-frame of the backhaul link and then determines uplink feedback information corresponding to each downlink transmission codeword transmitted in each downlink sub-frame. If two downlink transmission codewords are transmitted in a downlink sub-frame, then each downlink sub-frame will correspond to two pieces of uplink feedback information, that is, the RN device will determine one piece of uplink feedback information as a result of decoding each downlink transmission codeword.

Then the RN device performs high-order modulation on the uplink feedback information corresponding to the downlink transmission codeword transmitted in one downlink sub-frame to form one modulation symbol. A specific modulation scheme thereof is the same as the modulation scheme in the first scenario, and a repeated description thereof will be omitted here.

In an implementation, the RN device can further perform a logic addition process on and then modulate all the uplink feedback information corresponding to the downlink transmission codewords transmitted in one downlink sub-frame.

Finally the RN device transmits the uplink feedback information corresponding to the downlink transmission codeword over the PUCCH resource, in the uplink sub-frame of the backhaul link, corresponding to the downlink sub-frame.

In a second scheme, uplink feedback information is bound.

The base station selects from the pool of PUCCH resources one dedicated PUCCH resource respectively for each RN device served by the base station in the step 601.

Correspondingly the RN device determines one corresponding PUCCH resource in an uplink sub-frame of the backhaul link according to the received resource index number and receives at least one downlink transmission codeword in a downlink sub-frame of the backhaul link and then determines uplink feedback information corresponding to each downlink transmission codeword transmitted in each downlink sub-frame, adds up logically the uplink feedback information corresponding to the same downlink transmission codewords transmitted in all the downlink sub-frames corresponding to the same uplink sub-frame of the backhaul link and transmits the logically added-up uplink feedback information over the PUCCH resource in the uplink sub-frame of the backhaul link in the step 603.

Specifically the RN device determines one corresponding PUCCH resource in each uplink sub-frame according to the one resource index number.

The RN device receives at least one downlink transmission codeword in a downlink sub-frame of the backhaul link and then determines uplink feedback information corresponding to each downlink transmission codeword transmitted in each downlink sub-frame.

Then the RN device further determines among the determined uplink feedback information the uplink feedback information corresponding to the same downlink transmission codewords transmitted in downlink sub-frames corresponding to the same uplink sub-frame of the backhaul line.

The RN device adds up logically the uplink feedback information corresponding to the same downlink transmission codewords transmitted in the downlink sub-frames corresponding to the same uplink sub-frame of the backhaul line.

Since the respective downlink sub-frames subject to logical addition correspond to the same uplink sub-frame, the RN device transmits the logically added-up uplink feedback information over the PUCCH resource in the uplink sub-frame (i.e., the PUCCH resource corresponding to the received one resource index).

In a third scheme, uplink feedback information is multiplexed.

The base station selects from the pool of PUCCH resources a number M of dedicated PUCCH resources respectively for each RN device served by the base station in the step 601, where M is equal to the number of downlink sub-frames corresponding to one uplink sub-frame over the backhaul link.

Particularly the base station selects a resource index number in the third scheme as the base station selects a resource index number in the first scheme, and a repeated description thereof will be omitted here.

Correspondingly the RN device determines a number M of PUCCH resources, in an uplink sub-frame of the backhaul link, corresponding to a number M of resource index numbers and receives at least one downlink transmission codeword in a downlink sub-frame of the backhaul link and then determines uplink feedback information corresponding to each downlink transmission codeword transmitted in each downlink sub-frame, logically adds up logically all the uplink feedback information corresponding to the downlink transmission codewords transmitted in the same downlink sub-frame, determines bit information and one of the received M resource index numbers according to the number of downlink sub-frames corresponding to an uplink sub-frame and the logically added-up uplink feedback information of each downlink sub-frame corresponding to the uplink sub-frame, takes the determined bit information as uplink feedback information to be transmitted and transmits the uplink feedback information to be transmitted over the PUCCH resource, in the uplink sub-frame, corresponding to the determined resource index number in the step 603.

Specifically the RN device determines a number M of PUCCH resources in each uplink sub-frame according to the number M of resource index numbers.

The RN device receives at least one downlink transmission codeword in a downlink sub-frame of the backhaul link and then determines uplink feedback information corresponding to each downlink transmission codeword transmitted in each downlink sub-frame Then the RN device adds up logically all the uplink feedback information corresponding to the same downlink sub-frame.

The RN device determines bit information and one of the received M resource index numbers according to the number of downlink sub-frames corresponding to an uplink sub-frame and the logically added-up uplink feedback information of each downlink sub-frame corresponding to the uplink sub-frame.

If there is a downlink sub-frame in which a downlink transmission codeword is not transmitted, then the RN device marks this part of the downlink sub-frames as DTX. Correspondingly the RN device determines bit information and one of the received M resource index numbers according to the number of downlink sub-frames corresponding to an uplink sub-frame, the logically added-up uplink feedback information of each downlink sub-frame corresponding to the uplink sub-frame (the logic sum thereof of 1 indicates ACK, and this sum of 0 indicates MACK) and the DTX of the downlink sub-frames corresponding to the uplink sub-frame.

In a specific implementation, the RN device can determine bit information and one of the received M resource index numbers according to Tables 1 to 3.

Since both the bit information and the resource index number is determined according to the downlink sub-frames corresponding to the same uplink sub-frame, the RN device takes the bit information as uplink feedback information to be transmitted and transmits the uplink feedback information to be transmitted over the PUCCH resource, in the same uplink sub-frame, corresponding to the resource index number.

It shall be noted that the embodiments of the invention will be applicable but not limited to transmission between a base station and a relay device, and transmission between any network-side device with a control function (e.g., a base station, a Home eNB, a relay device with a control function, etc.) and a controlled device (e.g., a relay device, a user equipment, etc.) will come into the scope of the invention.

Those skilled in the art shall appreciate that the embodiments of the invention can be embodied as a method, system or computer program product. Therefore, the invention can be embodied in the form of an all-hardware embodiment, an all-software embodiment or an embodiment of software and hardware in combination. Furthermore the invention can be embodied in the form of a computer program product embodied in one or more computer useable storage mediums (including but not limited to a disk memory, a CD-ROM; an optical memory, etc.) in which computer useable program codes are contained.

The invention has been described in a flow chart and/or a block diagram of the method, the device (system) and the computer program product according to the embodiments of the invention. It shall be appreciated that respective flows and/or blocks in the flow chart and/or the block diagram and combinations of the flows and/or the blocks in the flow chart and/or the block diagram can be embodied in computer program instructions. These computer program instructions can be loaded onto a general-purpose computer, a specific-purpose computer, an embedded processor or a processor of another programmable data processing device to produce a machine so that the instructions executed on the computer or the processor of the other programmable data processing device create means for performing the functions specified in the flow(s) of the flow chart and/or the block(s) of the block diagram.

These computer program instructions can also be stored into a computer readable memory capable of directing the computer or the other programmable data processing device to operate in a specific manner so that the instructions stored in the computer readable memory create an article of manufacture including instruction means which perform the functions specified in the flow(s) of the flow chart and/or the block(s) of the block diagram.

These computer program instructions can also be loaded onto the computer or the other programmable data processing device so that a series of operational steps are performed on the computer or the other programmable data processing device to create a computer implemented process so that the instructions executed on the computer or the other programmable device provide steps for performing the functions specified in the flow(s) of the flow chart and/or the block(s) of the block diagram.

Although the preferred embodiments of the invention have been described, those skilled in the art benefiting from the underlying inventive concept can make additional modifications and variations to these embodiments. Therefore the appended claims are intended to be construed as encompassing the preferred embodiments and all the modifications and variations coming into the scope of the invention.

As can be apparent from the foregoing embodiments, in the embodiments of the invention, a base station selects from a pool of Physical Uplink Control Channel (PUCCH) resources at least one dedicated PUCCH resource for each Relay Node (RN) device served by the base station; and the base station transmits a resource index number corresponding to the determined PUCCH resource included in higher layer signaling respectively to the each RN device to instruct the RN device to determine the PUCCH resource according to the resource index number and to transmit uplink feedback information over the determined PUCCH resource.

With the solution to allocation of a PUCCH resource to a relay node device in an LTE-A system, the relay node device can transmit k feedback information over the allocated PUCCH resource.

Furthermore the utilization of resources for and the reliability of network transmission can be improved.

Evidently those skilled in the art can make various modifications and variations to the invention without departing from the spirit and the scope of the invention. Thus the invention is also intended to encompass these modifications and variations thereto as long as these modifications and variations come into the scope of the claims appended to the invention and their equivalents.

The invention claimed is:

1. A method for transmitting uplink feedback information, said method comprising:
 selecting from a pool of Physical Uplink Control Channel (PUCCH) resources, by a base station, at least one dedicated PUCCH resource for each Relay Node (RN) device served by the base station based upon the following conditions:
 when uplink feedback information received by the base station in one uplink sub-frame of a backhaul link corresponds to a downlink transmission code-word which was transmitted in a backhaul downlink sub-frame, then the base station selects from the pool of PUCCH resources one dedicated PUCCH resource for each RN device served by the base station; or
 when uplink feedback information received by the base station in one uplink sub-frame of a backhaul link corresponds to a plurality of downlink transmission code-words which were transmitted in a plurality of backhaul downlink sub-frames, then the base station selects from the pool of PUCCH resources a number M of dedicated PUCCH resources respectively for each RN device served by the base station, wherein M is equal to the number of downlink sub-frames corresponding to one uplink sub-frame in the backhaul link; or
 when uplink feedback information received by the base station in one uplink sub-frame of a backhaul link through binding corresponds to downlink transmission code-words which were transmitted in a plurality of backhaul downlink sub-frames, then the base station selects from the pool of PUCCH resources one dedicated PUCCH resource for each RN device served by the base station; or
 when uplink feedback information received by the base station in plurality of uplink sub-frames of a backhaul link through multiplexing corresponds to downlink transmission codewords which were transmitted in a plurality of backhaul downlink sub-frames, then the base station selects from the pool of PUCCH resources the number M of dedicated PUCCH resources respectively for each RN device served by the base station, wherein M is equal to the number of downlink sub-frames corresponding to one uplink sub-frame in the backhaul link;
 transmitting, by the base station, a resource index number corresponding to the determined PUCCH resource in a higher layer signaling to each RN device to instruct the RN device to determine the PUCCH resource over which uplink feedback information is to be transmitted in accordance with the resource index number.

2. The method according to claim 1, further comprising: selecting
 different PUCCH resources by the base station for each RN device served by the base station.

3. A method for transmitting uplink feedback information, the method comprising:
 receiving a resource index number, by a relay node (RN) device, which was transmitted by a base station; and
 determining, by the RN device, a corresponding Physical Uplink Control Channel (PUCCH) resource and then transmitting, by the RN device, uplink feedback information to the base station over the determined PUCCH resource, based on the following conditions:
 when uplink feedback information in one uplink sub-frame of a backhaul link corresponds to a downlink transmission code-word which was transmitted in a backhaul downlink sub-frame, then the RN device determines one corresponding PUCCH resource in an uplink sub-frame of the backhaul link in accordance with the received resource index number, and after RN device receives at least one downlink transmission code-word in a downlink sub-frame of the backhaul line, the RN device determines uplink feedback information corresponding to each downlink transmission code-word which was transmitted in the downlink sub-frame and transmits the determined uplink feedback information corresponding to the downlink transmission code-word over the determined PUCCH resource in the uplink sub-frame of the backhaul link corresponding to the downlink sub-frame; or
 when uplink feedback information in one uplink sub-frame of a backhaul link corresponds to a plurality of downlink transmission code-words which were transmitted in a plurality of backhaul downlink sub-frames, then the RN device determines a number M of PUCCH resources in the uplink sub-frame of the backhaul link in accordance with the number M of received resource index numbers, and the RN device determines a correspondence relationship between the PUCCH resources of the uplink sub-frame and respective downlink sub-frames corresponding to the uplink sub-frame, wherein M is equal to the number of downlink sub-frames corresponding to one uplink sub-frame in the backhaul link; and after the RN device receives at least one downlink transmission code-word in a downlink sub-frame of the backhaul link, the RN device determines uplink feedback information corresponding to each downlink transmission code-word which was transmitted in each downlink sub-frame and transmits all the uplink feedback information, corresponding to the downlink transmission code-words which were transmitted in one downlink sub-frame, over the one PUCCH resource in the uplink sub-frame of the backhaul link corresponding to the downlink sub-frame; or
 when uplink feedback information in one uplink sub-frame of a backhaul link through binding corresponds to downlink transmission code-words which were transmitted in a plurality of backhaul downlink sub-frames, then the RN device determines one PUCCH resource in an uplink sub-frame of the backhaul link in accordance with the received one resource index number, and after the RN device receives at least one downlink transmission code-word in a downlink sub-frame of the backhaul link, the RN device determines uplink feedback information corresponding to each downlink transmission code-word which was transmitted in each downlink sub-frame, adds up logically the uplink feedback information, corresponding to a same downlink transmission code-words which were transmitted in all downlink sub-frames corresponding to a same uplink sub-frame in the backhaul link, and transmits the logically added-up uplink feedback information over the PUCCH resource in the uplink sub-frame of the backhaul link; or when uplink feedback information in one uplink sub-frame of a backhaul link through multiplexing corresponds to downlink transmission code-words which were transmitted in a plurality of backhaul downlink sub-frames, then the RN device determines a number M of PUCCH resources, in an uplink sub-frame of the backhaul link, in accordance with the number M of received resource index numbers, wherein M is equal to the number of downlink sub-frames corresponding to one uplink sub-frame in the backhaul link; and after the RN device receives at least one downlink transmission code-word in a downlink sub-frame of the backhaul link, the RN device determines uplink feedback information, corresponding to each downlink transmission code-word which was transmitted in each downlink sub-frame, adds up logically all the uplink feedback information, corresponding to the downlink transmission code-words which were transmitted in a same downlink sub-frame, determines bit information and one of the received M resource index numbers in accordance with the number of downlink sub-frames corresponding to an uplink sub-frame and the logically added-up uplink feedback information of each downlink sub-frame corresponding to the uplink sub-frame, takes the determined bit information as uplink feedback information to be transmitted and transmits the uplink feedback information to be transmitted over the PUCCH resource, in the uplink sub-frame, corresponding to the determined resource index number.

4. A base station comprising:
a memory device storing selection module instructions and index number module instructions; and
a computer processor upon executing the selection module instructions performs the following:
selecting from a pool of Physical Uplink Control Channel (PUCCH) resources, by a base station, at least one dedicated PUCCH resource for each Relay Node (RN) device served by the base station based on the following conditions:
when uplink feedback information received by the base station in one uplink sub-frame of a backhaul link corresponds to a downlink transmission code-word which was transmitted in a backhaul downlink sub-frame, then the base station selects from the pool of PUCCH resources one dedicated PUCCH resource for each RN device served by the base station; or
when uplink feedback information received by the base station in one uplink sub-frame of a backhaul link corresponds to a plurality of downlink transmission code-words which were transmitted in a plurality of backhaul downlink sub-frames, then the base station selects from the pool of PUCCH resources a number M of dedicated PUCCH resources respectively for each RN device served by the base station, wherein M is equal to the number of downlink sub-frames corresponding to one uplink sub-frame in the backhaul link; or
when uplink feedback information received by the base station in one uplink sub-frame of a backhaul link through binding corresponds to downlink transmission code-words which were transmitted in a plurality of backhaul downlink sub-frames, then the base station selects from the pool of PUCCH resources one dedicated PUCCH resource for each RN device served by the base station; or when uplink feedback information received by the base station in plurality of uplink sub-frames of a backhaul link through multiplexing corresponds to downlink transmission codewords which were transmitted in a plurality of backhaul downlink sub-frames, then the base station selects from the pool of PUCCH resources the number M of dedicated PUCCH resources respectively for each RN device served by the base station, wherein M is equal to the number of downlink sub-frames corresponding to one uplink sub-frame in the backhaul link, the computer processor upon executing said index number transmission module instructions performs the following:

transmitting, a resource index number corresponding to the determined PUCCH resource in higher layer signaling to each RN device to instruct the RN device to determine the PUCCH resource over which uplink feedback information is to be transmitted in accordance with the resource index.

5. The base station according to claim 4, wherein the memory device further stores selection module instructions which when executed by the computer processor performs the following: selecting a different PUCCH resources for each RN device served by the base station.

6. A Relay Node (RN) device comprising:
a memory device storing resource determination module instructions; and
a computer processor upon executing resource determination module instructions performs the following:
receiving a resource index number, by a Relay Node (RN) device, which was transmitted by a base station; and
determining, by the RN device, a corresponding Physical Uplink Control Channel (PUCCH) resource and then transmitting, by the RN device, uplink feedback information to the base station over the determined PUCCH resource, based on the following conditions:
when uplink feedback information in one uplink sub-frame of a backhaul link corresponds to a downlink transmission code-word which was transmitted in a backhaul downlink sub-frame, then the RN device determines one corresponding PUCCH resource in an uplink sub-frame of the backhaul link in accordance with the received resource index number, and after RN device receives at least one downlink transmission code-word in a downlink sub-frame of the backhaul line, the RN device determines uplink feedback information corresponding to each downlink transmission code-word which was transmitted in the downlink sub-frame and transmits the determined uplink feedback information corresponding to the downlink transmission code-word over the determined PUCCH resource in the uplink sub-frame of the backhaul link corresponding to the downlink sub-frame; or when uplink feedback information in one uplink sub-frame of a backhaul link corresponds to a plurality of downlink transmission code-words which were transmitted in a plurality of backhaul downlink sub-frames, then the RN device determines a number M of PUCCH resources in the uplink sub-frame over the backhaul link in accordance with the number M of received resource index numbers, and the RN device determines a correspondence relationship between the PUCCH resources of the uplink sub-frame and respective downlink sub-frames corresponding to the uplink sub-frame, wherein M is equal to the number of downlink sub-frames corresponding to one uplink sub-frame in the backhaul link; and after the RN device receives at least one downlink transmission code-word in a downlink sub-frame of the backhaul link, the RN device determines uplink feedback information corresponding to each downlink transmission code-word which was transmitted in each downlink sub-frame and transmits all the uplink feedback information, corresponding to the downlink transmission code-words which were transmitted in one downlink sub-frame, over the one PUCCH resource in the uplink sub-frame of the backhaul link corresponding to the downlink sub-frame; or when uplink feedback information in one uplink sub-frame of a backhaul link through binding corresponds to downlink transmission code-words which were transmitted in a plurality of backhaul downlink sub-frames, then the RN device determines one PUCCH resource in an uplink sub-frame of the backhaul link in accordance with the received one resource index number, and after the RN device receives at least one downlink transmission code-word in a downlink sub-frame of the backhaul link, the RN device determines uplink feedback information corresponding to each downlink transmission code-word which was transmitted in each downlink sub-frame, adds up logically the uplink feedback information, corresponding to a same downlink transmission code-words which were transmitted in all downlink sub-frames corresponding to a same uplink sub-frame of the backhaul link, and transmits the logically added-up uplink feedback information over the PUCCH resource in the uplink sub-frame of the backhaul link; or when uplink feedback information in one uplink sub-frame of a backhaul link through multiplexing corresponds to downlink transmission code-words which were transmitted in a plurality of backhaul downlink sub-frames, then the RN device determines a number M of PUCCH resources, in an uplink sub-frame of the backhaul link, in accordance with the number M of received resource index numbers, wherein M is equal to the number of downlink sub-frames corresponding to one uplink sub-frame in the backhaul link; and after the RN device receives at least one downlink transmission code-word in a downlink sub-frame of the backhaul link, the RN device determines uplink feedback information, corresponding to each downlink transmission code-word which was transmitted in each downlink sub-frame, adds up logically all the uplink feedback information corresponding to the downlink transmission code-words which were transmitted in the same downlink sub-frame, determines bit information and one of the received M resource index numbers in accordance with the number of downlink sub-frames corresponding to an uplink sub-frame and the logically added-up uplink feedback information of each downlink sub-frame corresponding to the uplink sub-frame, takes the determined bit information as uplink feedback information to be transmitted and transmits the uplink feedback information to be transmitted over the PUCCH resource, in the uplink sub-frame, corresponding to the determined resource index number.

* * * * *